(12) United States Patent
Mori et al.

(10) Patent No.: US 11,701,875 B2
(45) Date of Patent: Jul. 18, 2023

(54) FOIL TRANSFER APPARATUS

(71) Applicant: Brother Kogyo Kabushiki Kaisha, Nagoya (JP)

(72) Inventors: Kentaro Mori, Kasugai (JP); Ryosuke Sakai, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/453,350

(22) Filed: Nov. 3, 2021

(65) Prior Publication Data

US 2022/0143966 A1  May 12, 2022

(30) Foreign Application Priority Data

Nov. 12, 2020  (JP) ................. 2020-188920

(51) Int. Cl.
*B32B 41/00* (2006.01)
*B32B 37/00* (2006.01)
*B32B 15/04* (2006.01)

(52) U.S. Cl.
CPC ............ *B32B 37/025* (2013.01); *B32B 15/04* (2013.01); *B32B 41/00* (2013.01)

(58) Field of Classification Search
CPC ....... B32B 37/025; B32B 15/04; B32B 41/00; B32B 37/0046; B32B 37/223; B32B 2037/0061

USPC .................... 156/60, 64, 350, 351, 378, 379
See application file for complete search history.

(56) References Cited

U.S. PATENT DOCUMENTS

2022/0016878 A1*  1/2022  Yamamoto ......... G03G 15/6582

FOREIGN PATENT DOCUMENTS

JP        2020-121788 A     8/2020
WO   WO-2020158004 A1 *  8/2020  ......... B32B 37/0053

* cited by examiner

*Primary Examiner* — Michael N Orlando
*Assistant Examiner* — Joshel Rivera
(74) *Attorney, Agent, or Firm* — Burr Patent Law, PLLC

(57) ABSTRACT

A foil transfer apparatus configured to transfer foil of a foil film to a sheet includes a cover movable between a closed position and an open position, a lock mechanism capable of locking the cover at the closed position, a heating member, a pressurizing member, a temperature sensor, and a controller configured to: calculate a first lock determination temperature and a second lock determination temperature that are values obtained by respectively adding a first correction value and a second correction value that are determined based on a condition for performing a foil transfer operation to a detection temperature detected by the temperature; control the lock mechanism to lock the cover when the first lock determination temperature is not lower than a first threshold; and control the lock mechanism to unlock the cover when the second lock determination temperature is lower than a second threshold.

20 Claims, 12 Drawing Sheets

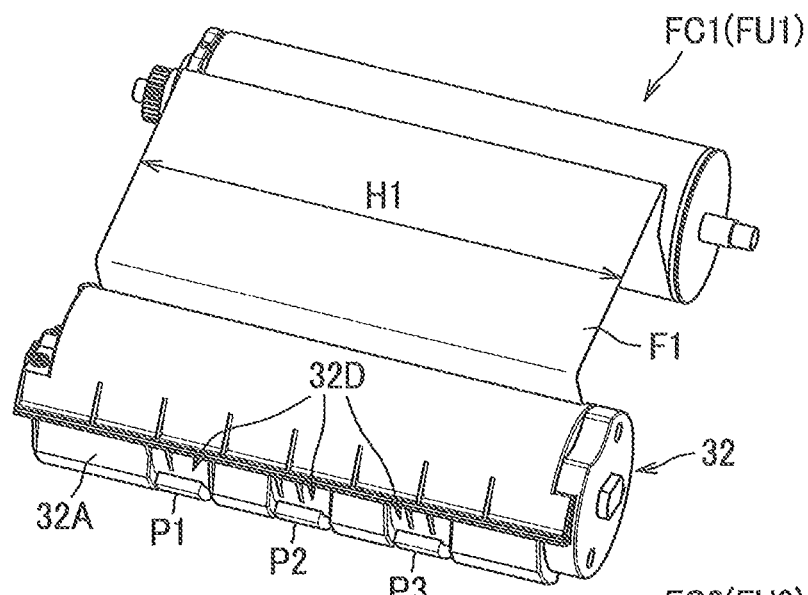
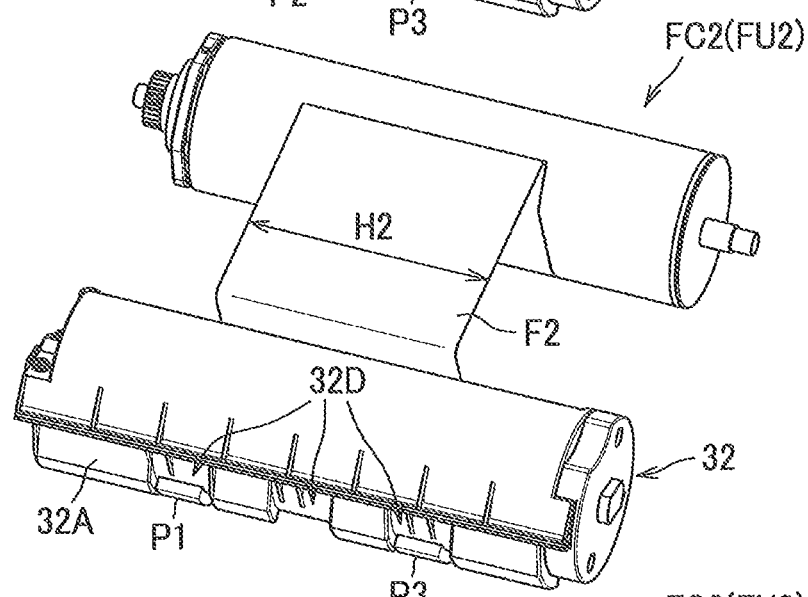
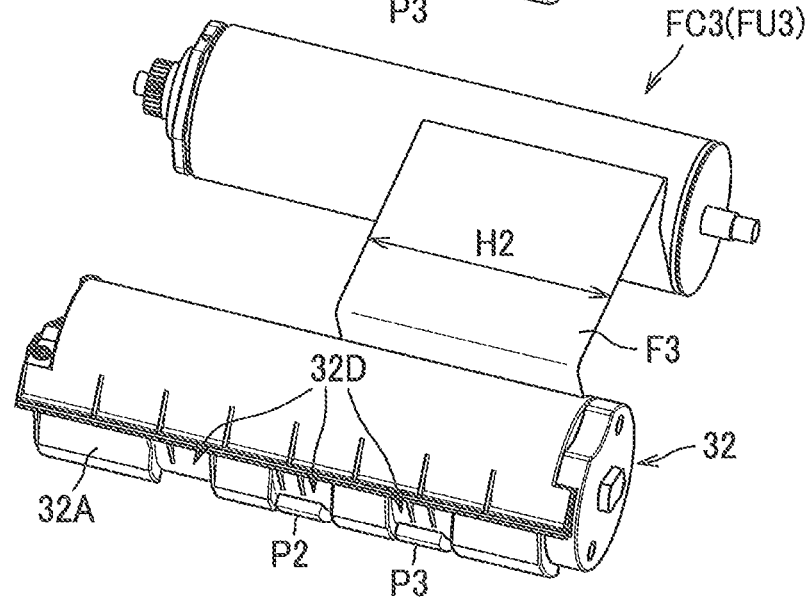

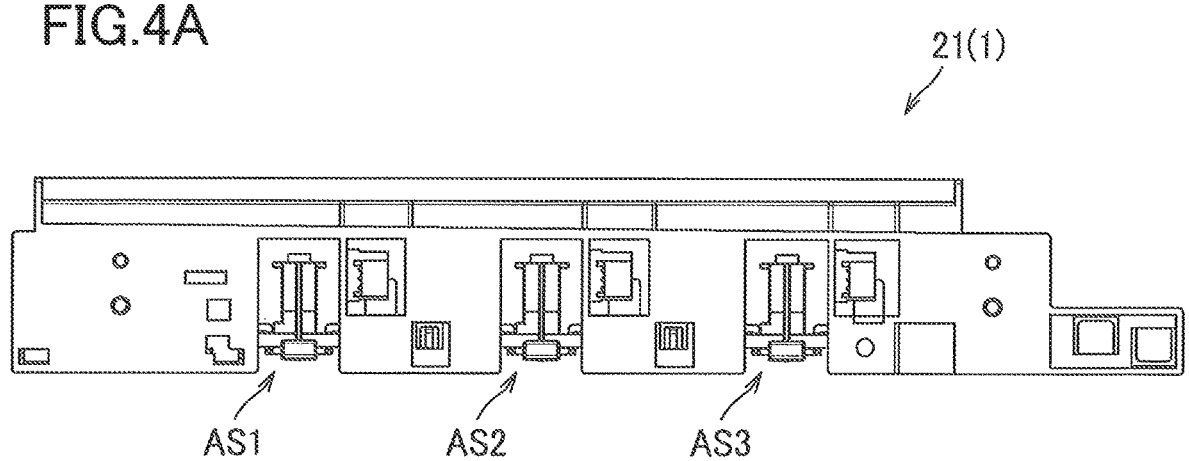

FIG.11

| TYPE OF FOIL FILM | FIRST CORRECTION VALUE A | SECOND CORRECTION VALUE B |
|---|---|---|
| FIRST FOIL FILM (FULL WIDTH) | A1 | B1 |
| SECOND FOIL FILM (HALF WIDTH, CENTER ALIGNMENT) | A2 | B2 |
| THIRD FOIL FILM (HALF WIDTH, ONE-SIDED ALIGNMENT) | A3 | B3 |

| SHEET WIDTH | FIRST CORRECTION VALUE A | SECOND CORRECTION VALUE B |
|---|---|---|
| FIRST WIDTH (NARROW) | A4 | B4 |
| SECOND WIDTH (WIDE) | A5 | B5 |

$A4 > A5 \qquad B5 = B4$

FIG.12B

| SHEET THICKNESS | FIRST CORRECTION VALUE A | SECOND CORRECTION VALUE B |
|---|---|---|
| FIRST THICKNESS (THIN) | A6 | B6 |
| SECOND THICKNESS (THICK) | A7 | B7 |

$A6 > A7 \qquad B7 = B6$

FIG.12C

| FOIL TRANSFER MODE | FIRST CORRECTION VALUE A | SECOND CORRECTION VALUE B |
|---|---|---|
| NORMAL MODE | A8 | B8 |
| FOIL SAVE MODE | A9 | B9 |

$A8 < A9 \qquad B8 < B9$

FOIL TRANSFER APPARATUS

CROSS REFERENCE TO RELATED APPLICATION

The present application claims priority to Japanese Patent Application No. 2020-188920, which was filed on Nov. 12, 2020, the disclosure of which is herein incorporated by reference in its entirety.

BACKGROUND

The following disclosure relates to a foil transfer apparatus configured to transfer foil to a sheet.

A conventionally known foil transfer apparatus includes a supply reel around which a foil film is wound, a take-up reel around which the foil film is taken up, a heating roller that heats the foil film and the sheet, and a pressure roller that cooperates with the heating roller to nip the foil film and the sheet therebetween. In the known foil transfer apparatus, the cover can be opened to enable replacement of the foil film and removal of a jammed sheet. The foil transfer apparatus is configured such that the cover is locked so as not to be opened when a temperature in the apparatus is not lower than a threshold after a foil transfer operation has been performed.

SUMMARY

In the known apparatus described above, the condition to lock the cover and the condition to unlock the cover do not take account of operating conditions of the foil transfer apparatus. It is usual in such a case to employ the most severe condition to lock the cover among all conditions in view of safety. In this case, however, the cover is kept locked, namely, the cover is not unlocked, even though the apparatus is in a state in which the cover may be unlocked. This unnecessarily prolongs the locked state of the cover, resulting in a reduction in convenience for users.

Accordingly, an aspect of the present disclosure is directed to a technique of preventing the cover from being kept locked for a length of time longer than necessary.

In one aspect of the present disclosure, a foil transfer apparatus configured to superpose a sheet on a foil film including foil and to transfer the foil to the sheet includes: a housing body having an opening; a cover movable between a closed position at which the cover closes the opening and an open position at which the cover exposes the opening; a lock mechanism (lock lever) capable of locking the cover at the closed position; a heating member (heating roller) configured to heat the foil film and the sheet; a pressurizing member (pressurizing roller) configured to cooperate with the heating member to nip the foil film and the sheet therebetween; a temperature sensor; and a controller, wherein the controller is configured to: calculate a first lock determination temperature and a second lock determination temperature, the first lock determination temperature being a value obtained by adding a first correction value to a detection temperature detected by the temperature sensor, the second lock determination temperature being a value obtained by adding a second correction value that is different from the first correction value to the detection temperature detected by the temperature sensor, the first correction value and the second correction value being determined based on a condition for performing a foil transfer operation; and control the lock mechanism to lock the cover when the first lock determination temperature is not lower than a first threshold and control the lock mechanism to unlock the cover when the second lock determination temperature is lower than a second threshold.

In another aspect of the present disclosure, a foil transfer apparatus configured to superpose a sheet on a foil film including foil and to transfer the foil to the sheet includes: a housing body having an opening; a cover movable between a closed position at which the cover closes the opening and an open position at which the cover exposes the opening; a lock mechanism capable of locking the cover at the closed position; a heating member configured to heat the foil film and the sheet; a pressurizing member configured to cooperate with the heating member to nip the foil film and the sheet therebetween; a temperature sensor; and a controller, wherein the controller is configured to control the lock mechanism to lock the cover when a detection temperature detected by the temperature sensor is not lower than a value obtained by subtracting a third correction value from a third threshold and to control the lock mechanism to unlock the cover when the detection temperature detected by the temperature sensor is not lower than a value obtained by subtracting a fourth correction value from a fourth threshold, the third correction value and the fourth correction value being determined based on a condition for performing a foil transfer operation.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which:

FIG. 3A is a perspective view of a first film cartridge;

FIG. 3B is a perspective view of a second film cartridge;

FIG. 3C is a perspective view of a third film cartridge;

FIG. 4A is a view of three film sensors;

FIG. 4B is a table illustrating detection details of the sensors;

FIG. 11 is a table illustrating the first correction value and the second correction value corresponding to a type of the foil film;

FIG. 12A is a table illustrating the first correction value and the second correction value corresponding to a sheet width;

FIG. 12B is a table illustrating the first correction value and the second correction value corresponding to a sheet thickness; and FIG. 12C is a table illustrating the first correction value and the second correction value corresponding to a foil transfer mode.

DETAILED DESCRIPTION OF THE EMBODIMENT

Figure 1:
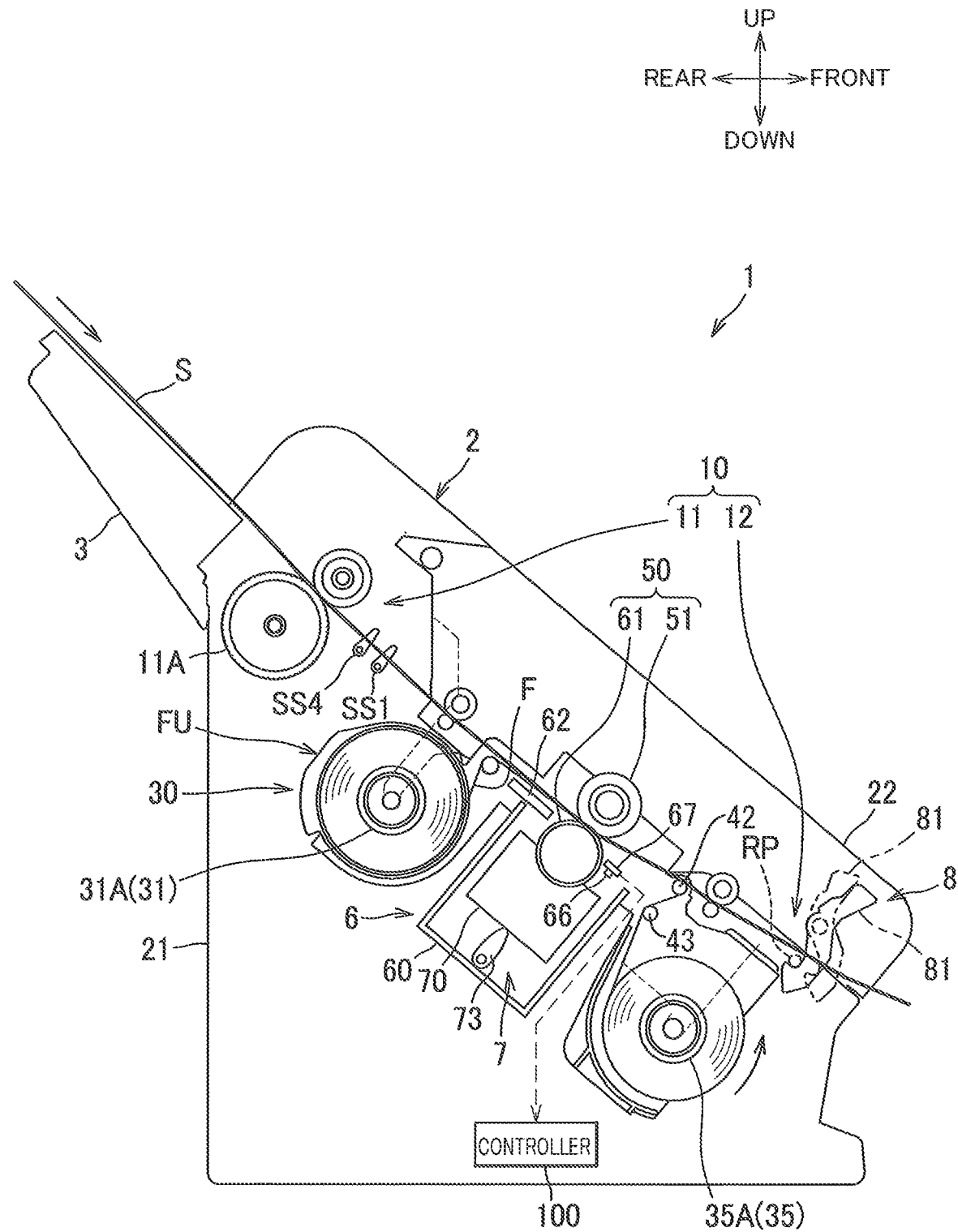
FIG. 1 is a view of a foil transfer apparatus according to one embodiment of the present disclosure.

Referring to the drawings, there will be hereinafter described a foil transfer apparatus according to one embodiment of the present disclosure.

In the following description, an overall configuration of the foil transfer apparatus will be first explained, and a characterizing feature of the present disclosure will be then explained.

In the following description, directions are explained based on directions illustrated in FIG. 1. That is, a right side and a left side in FIG. 1 are respectively defined as a front side and a rear side of the foil transfer apparatus, and a front side and a rear side of the sheet of FIG. 1 are respectively defined as a left side and a right side of the foil transfer apparatus. An upper side and a lower side of FIG. 1 are respectively defined as an upper side and a lower side of the foil transfer apparatus.

The foil transfer apparatus denoted at 1 in FIG. 1 is configured to transfer foil such as gold to a toner image formed on a sheet S by an image forming apparatus such as a laser printer. That is, the foil transfer apparatus 1 forms a foil image on the sheet S by transferring the foil on the toner image of the sheet S. The foil transfer apparatus 1 includes a housing 2, a sheet tray 3, a sheet conveyor 10, a film supplier 30, a transfer device 50 and a controller 100.

Figure 2:
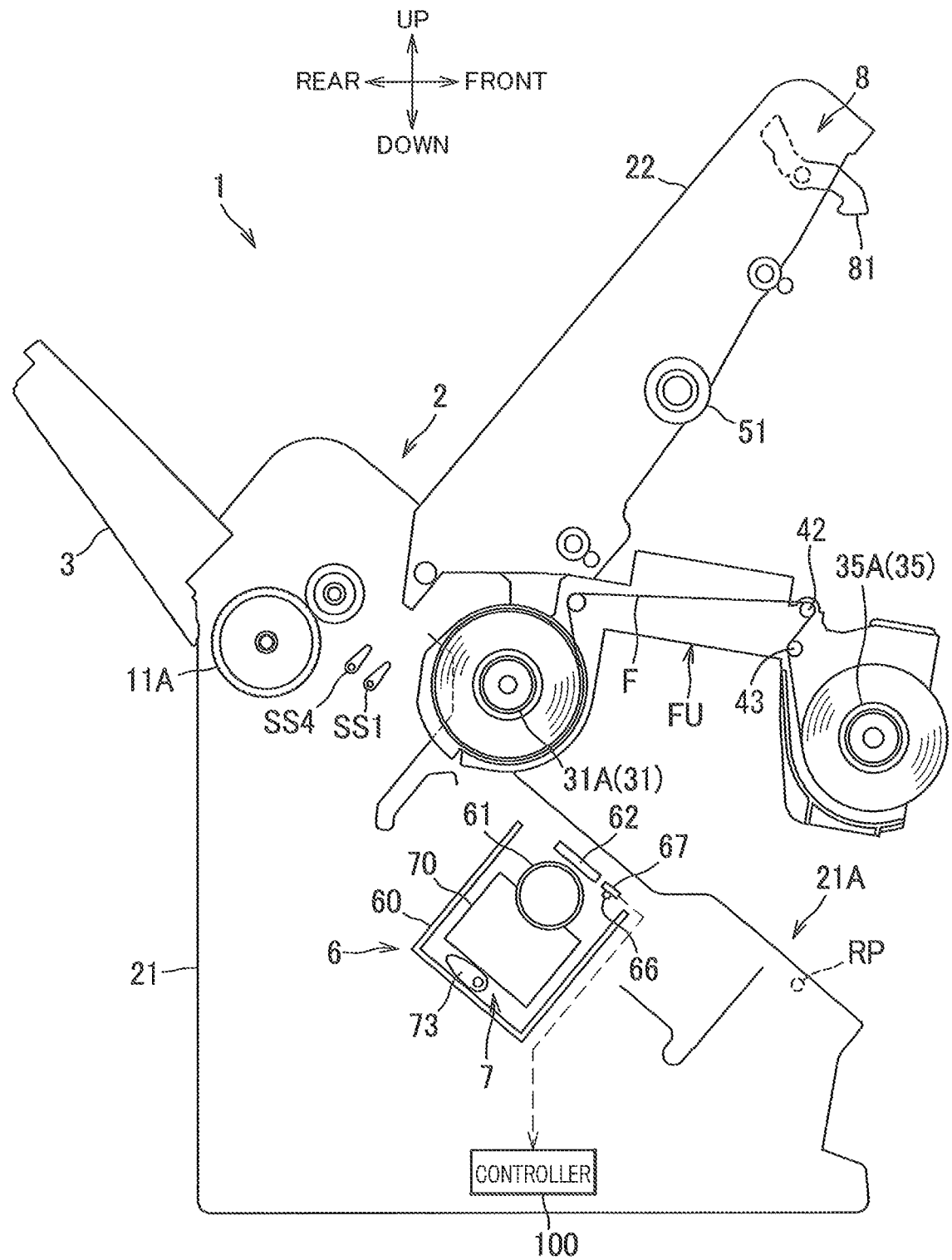
FIG. 2 is a view of the foil transfer apparatus in a state in which a cover is opened.

The housing 2 is formed of a resin or the like and includes a housing body 21 and a cover 22. The housing body 21 has, at an upper portion thereof, an opening 21A (FIG. 2). The opening 21A is for mounting and dismounting a film unit FU (that will be described) on and from the housing body 21. The cover 22 is a member for opening and closing the opening 21A. The cover 22 is pivotably supported at a rear end portion thereof by the housing body 21. The cover 22 is pivotable between a closed position (FIG. 1) at which the cover 22 closes the opening 21A and an open position (FIG. 2) at which the cover 22 exposes the opening 21A.

The foil transfer apparatus 1 includes a lock mechanism 8 that locks the cover 22 at the closed position. The lock mechanism 8 will be later explained in detail.

The sheet tray 3 is a tray on which the sheets S such as paper and OHP films are placed. The sheet tray 3 is disposed at a rear portion of the housing 2. Each of the sheets S is placed on the sheet tray 3 such that a surface thereof, on which the toner image has been formed, faces downward.

The sheet conveyor 10 includes a sheet supply mechanism 11 and a sheet discharge mechanism 12. The sheet supply mechanism 11 is configured to convey the sheets S on the sheet tray 3 one by one toward the transfer device 50. The sheet supply mechanism 11 includes a pickup roller 11A and conveyor rollers.

The sheet discharge mechanism 12 is a mechanism for discharging, to outside the housing 2, the sheet S that has passed the transfer device 50. The sheet discharge mechanism 12 includes a plurality of conveyor rollers.

The film supplier 30 is configured to supply the foil film F such that the foil film F is superposed on the sheet S conveyed from the sheet supply mechanism 11. The film supplier 30 includes a film unit FU and a drive source such as a motor (not illustrated).

As illustrated in FIG. 2, the film unit FU is mountable to and dismountable from the housing body 21 via the opening 21A in a direction orthogonal to an axial direction of a supply reel 31 that will be explained. The film unit FU includes the supply reel 31 and a take-up reel 35. The foil film F is wound around the supply reel 31.

The foil film F is a film constituted by a plurality of layers. Specifically, the foil film F includes a supporting layer and a supported layer. The supporting layer is a tape-like transparent base formed of a high molecular material. The supporting layer supports the supported layer. The supported layer includes a separation layer, a transfer layer, and an adhesive layer, for instance. The separation layer is a layer for permitting the transfer layer to be easily peeled off from the supporting layer. The separation layer is disposed between the supporting layer and the transfer layer. The separation layer contains a transparent material, such as a wax resin, that permits itself to be easily peeled off from the supporting layer.

The transfer layer is a layer to be transferred to the toner image and contains foil. The foil is a thin sheet of metal such as gold, silver, copper, or aluminum. The transfer layer contains a thermoplastic resin and a colorant such as a gold colorant, a silver colorant, or a red colorant. The transfer layer is disposed between the separation layer and the adhesive layer. The adhesive layer is a layer for permitting the transfer layer to be easily bonded to the toner image. The adhesive layer contains a material, such as a polyvinyl chloride resin or an acrylic resin, which is easily bonded to the toner image heated by the transfer device 50 (that will be described).

The supply reel 31 is formed of a resin or the like and includes a supply shaft portion 31A around which the foil film F is wound. One of opposite ends of the foil film F is fixed to the supply shaft portion 31A. The foil film F is wound around the supply reel 31 such that the supporting layer faces outward and the supported layer faces inward.

The take-up reel 35 is formed of a resin or the like and includes a take-up shaft portion 35A around which the foil film F is taken up. The other of the opposite ends of the foil film F is fixed to the take-up shaft portion 35A. The foil film F is wound around the take-up reel 35 such that the supporting layer faces outward and the supported layer faces inward.

For convenience sake, FIG. 1, etc., illustrate a state in which the foil film F is wound around both the supply reel 31 and the take-up reel 35 to a maximum extent. Actually, in a new condition of the film unit FU, the diameter of the roll-like foil film F wound around the supply reel 31 is maximum while the foil film F is not wound around the take-up reel 35 or the diameter of the roll-like foil film F wound around the take-up reel 35 is minimum. On the other hand, when the film unit FU reaches the end of its life, namely, when the foil film F is used up, the diameter of the roll-like foil film F wound around the take-up reel 35 is maximum while the foil film F is not wound around the supply reel 31 or the diameter of the roll-like foil film F wound around the supply reel 31 is minimum.

In a state in which the film unit FU is mounted on the foil transfer apparatus 1, the take-up reel 35 is driven and rotated counterclockwise in FIG. 1 by the drive source not illustrated. When the take-up reel 35 rotates, the foil film F wound around the supply reel 31 is drawn. The foil film F drawn from the supply reel 31 is taken up around the take-up reel 35. Specifically, in a foil transfer operation, the foil film F is sent by a pressure roller 51 and a heating roller 61 (both of which will be described), so that the foil film F is drawn from the supply reel 31. The foil film F that has been sent by the pressure roller 51 and the heating roller 61 is taken up around the take-up reel 35.

The transfer device 50 is configured to transfer the transfer layer to the toner image formed on the sheet S by heating and pressurizing the sheet S and the foil film F that are superposed on each other. The transfer device 50 includes the pressure roller 51 as one example of a pressurizing member and the heating roller 61 as one example of a heating member. The transfer device 50 heats and pressurizes the sheet S and the foil film F superposed on each other at a nip position between the pressure roller 51 and the heating roller 61.

The pressure roller 51 is a roller formed by covering the circumferential surface of a cylindrical core metal with a rubber layer formed of silicone rubber. The pressure roller 51 is disposed so as to be located on an upper side of the foil film F and is capable of contacting the back surface of the sheet S, i.e., the surface of the sheet S opposite to the front surface thereof on which the toner image is formed.

The pressure roller 51 is rotatably supported at opposite ends thereof by the cover 22. The pressure roller 51 cooperates with the heating roller 61 to nip the sheet S and the foil film F therebetween. The pressure roller 51 is driven and rotated by the drive source not illustrated so as to rotate the heating roller 61.

The heating roller 61 is a rotatable roller constituted by a cylindrical metal pipe in which is disposed a heater. The heating roller 61 heats the foil film F and the sheet S. The heating roller 61 is disposed so as to be located on a lower side of the foil film F and is capable of contacting the foil film F.

In the present embodiment, the heating roller 61 is moved by a roller-position change mechanism 7 configured to cause the heating roller 61 to come into contact with and move away from the foil film F. The roller-position change mechanism 7 is a mechanism for moving the heating roller 61 between a press-contact position at which the heating roller 61 is in pressing contact with the pressure roller 51 and a spaced position at which the heating roller 61 is spaced apart from the pressure roller 51. In the state in which the film unit FU is mounted on the film transfer apparatus 1, the heating roller 61 is in contact with the foil film F when the heating roller 61 is located at the press-contact position. In a state in which the cover 22 is closed, the roller-position change mechanism 7 causes the heating roller 61 to move to a contact position at which the heating roller 61 contacts the foil film F, at timing when the sheet S is supplied to the transfer device 50. In a case where the cover 22 is opened or in a case where the foil transfer operation is not performed on the sheet S by the transfer device 50, the roller-position change mechanism 7 causes the heating roller 61 to be kept located at a spaced position at which the heating roller 61 is spaced apart from the foil film F.

In the thus constructed foil transfer apparatus 1, the sheets S each placed on the sheet tray 3 with the front surface thereof facing downward are conveyed by the sheet supply mechanism 11 one by one toward the transfer device 50. The sheet S is superposed on the foil film F supplied from the supply reel 31 on the upstream side of the transfer device 50 in a conveying direction of the sheet S and is then conveyed to the transfer device 50 in a state in which the toner image of the sheet S and the foil film F are in contact with each other. The conveying direction of the sheet S will be hereinafter simply referred to as "conveying direction".

In the transfer device 50, when the sheet S and the foil film F pass the nip position between the pressure roller 51 and the heating roller 61, the sheet S and the foil film are heated and pressurized by the heating roller 61 and the pressure roller 51, so that the foil is transferred onto the toner image. The foil film F is peeled off from the sheet S on the downstream side of the transfer device 50.

The foil film F peeled off from the sheet S is taken up around the take-up reel 35. On the other hand, the sheet S from which the foil film F is peeled off is discharged by the sheet discharge mechanism 12 to outside the housing 2 in a state in which the front surface of the sheet S on which the foil has been transferred faces downward.

The controller 100 includes a CPU, a RAM, a ROM, and an input/output circuit. The controller 100 controls the foil transfer apparatus 1 by executing various arithmetic processings based on programs and data stored in the ROM, etc. The operations of the controller 100 will be later explained in detail.

The foil transfer apparatus 1 is configured such that the foil film F of a plurality of kinds of width is mountable thereon. The foil transfer apparatus 1 is configured such that the sheet S of a plurality of kinds of width can be conveyed.

Referring to FIGS. 3A-3C and 9, the foil film F mountable on the foil transfer apparatus 1 will be explained.

Figure 5:
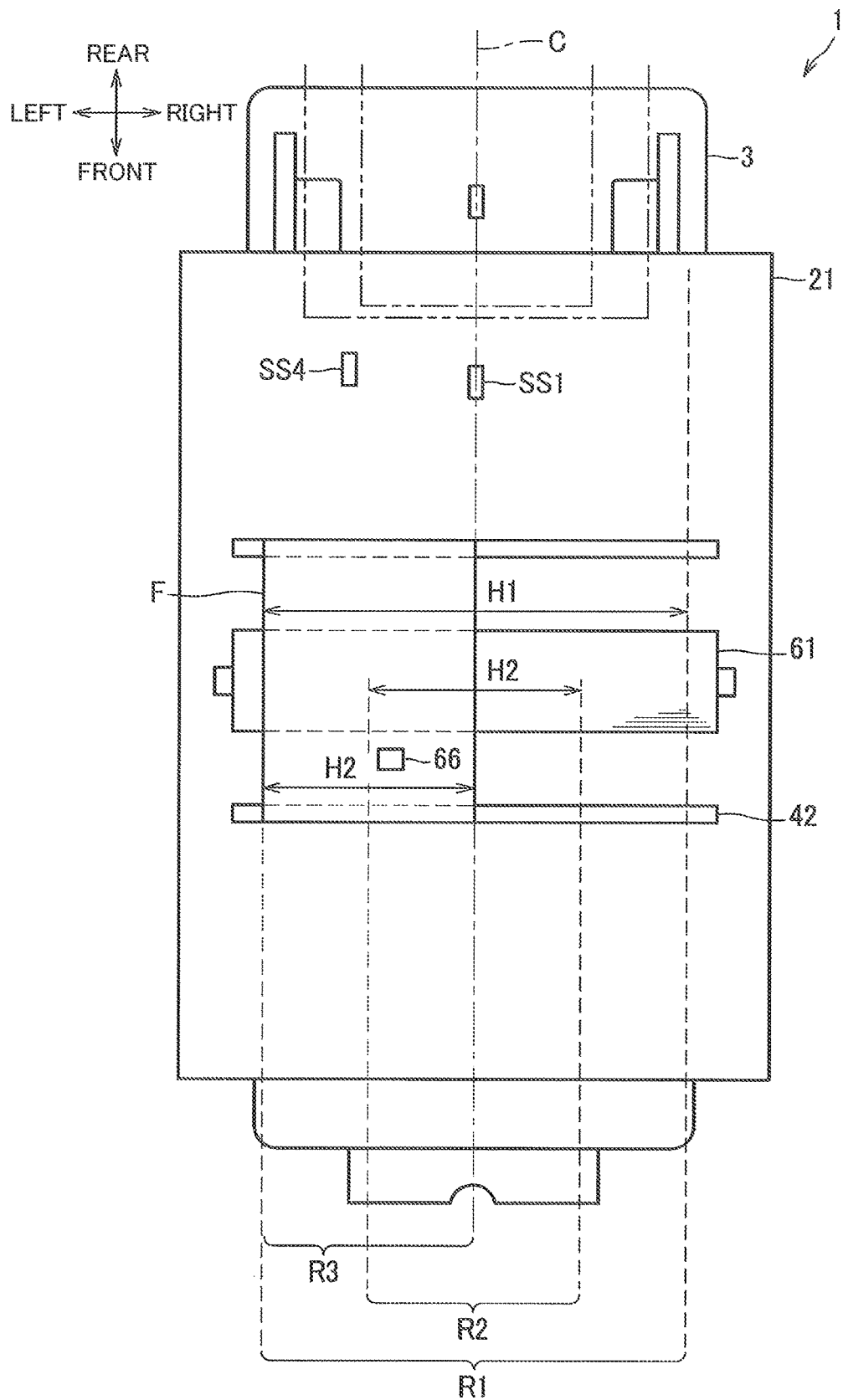
FIG. 5 is a view of the foil transfer apparatus seen from the top for explaining locations of the foil films and the sheet sensors.

The foil transfer apparatus 1 is configured such that any of a first foil film F1, a second foil film F2, and a third foil film F3 is mountable thereon. The first foil film F1 is the foil film F having a first width H1. As illustrated in FIG. 5, the second foil film F2 is the foil film F having a second width H2 smaller than the first width H1. The second foil film F2 is mounted in a central region R2 that is located at a widthwise central portion of a region R1 in which the first foil film F1 is mounted. The third foil film F3 is the foil film F having the second width H2. The third foil film F3 is mounted in a one-side shifted region R3 that is shifted to one of widthwise opposite sides (i.e., the left side in FIG. 5) in the region R1 in which the first foil film F1 is mounted.

As illustrated in FIG. 3A, the film unit FU, to which a first film cartridge FC1 including the foil film F with the first width H1 is attached, is referred to as a first film unit FU1. The first width H1 is a maximum width of the foil film F that is mountable on the film unit FU. One example of the first width H1 is 220 mm. The first film unit FU1 is suitably used for any sheet S that can be conveyed. The first film unit FU1 is particularly suitable in a case where the foil transfer operation is desired to be performed over an entire width of the sheet S having a large width.

In the first film unit FU1, engagement pieces P1, P2, P3 are fixed respectively in three recesses 32D formed in an outer circumferential wall 32A of a supply case 32.

As illustrated in FIG. 3B, the film unit FU, to which is attached a second film cartridge FC2 in which the foil film F with the second width H2 is disposed so as to be centered relative to the width direction of the film unit FU, is referred to as a second film unit FU2. The second width H2 is smaller than the first width H1. One example of the second width H2 is 110 mm. The second film unit FU2 is suitable in a case where the foil transfer operation is desired to be performed on the sheet having a small width or on only the central region R2 of the sheet having a large width. The use of second film unit FU2 enables the foil film F to be saved (FIG. 5).

In the second film unit FU2, the engagement pieces P1, P3 are fixed respectively in the two recesses 32D, i.e., the left-side and right-side recesses 32D, among the three recesses 32D formed in the outer circumferential wall 32A. As illustrated in FIG. 3B, the engagement piece is not fixed in the central one of the three recesses 32D.

As illustrated in FIG. 3C, the film unit FU, to which is attached a third film cartridge FC3 in which the foil film F with the second width H2 is disposed so as to be shifted or off-centered to one side in the width direction of the film unit FU, is referred to as a third film unit FU3. The third film unit FU3 is suitable in a case where the foil transfer operation is desired to be performed on only the one-side shifted region R3 of the sheet S having a large width. The use of the third film unit FU3 enables the foil film to be saved (FIG. 5).

In the third film unit FU3, the engagement pieces P2, P3 are fixed respectively in the two recesses 32D, i.e., the central recess 32D and one of the left-side and right-side recesses 32D, among the three recess 32D formed in the outer circumferential wall 32A. As illustrated in FIG. 3C, the engagement piece is not fixed in the other of the left-side and right-side recesses 32D.

As illustrated in FIG. 4A, the foil transfer apparatus 1 includes foil film sensors for detecting the width of the foil film F. The foil film sensors include a first sensor AS1, a second sensor AS2, and a third sensor AS3.

The first sensor AS1, the second sensor AS2, and the third sensor AS3 are disposed respectively at positions corresponding to the three recesses 32D formed in the outer circumferential wall 32A of the supply case 32 in the state in which the film unit FU is mounted on the housing body 21.

The first sensor AS1 transmits, to the controller 100, a signal indicative of LOW when the first sensor AS1 detects the engagement piece P1 of the film unit FU and a signal indicative of HIGH when the first sensor AS1 does not detect the engagement piece P1.

The second sensor AS2 transmits, to the controller 100, a signal indicative of LOW when the second sensor AS2 detects the engagement piece P2 of the film unit FU and a signal indicative of HIGH when the second sensor AS2 does not detect the engagement piece P2.

The third sensor AS3 transmits, to the controller 100, a signal indicative of LOW when the third sensor AS3 detects the engagement piece P3 of the film unit FU and a signal indicative of HIGH when the third sensor AS3 does not detect the engagement piece P3.

In response to reception of the signals from the first sensor AS1, the second sensor AS2, and the third sensor AS3, the controller 100 determines which one of the first film unit FU1, the second film unit FU2, and the third film unit FU3 is currently mounted on the housing body 21.

Specifically, when the signals from the first sensor AS1, the second sensor AS2, and the third sensor AS3 are all LOW, the controller 100 determines that the first film unit FU1 is currently mounted on the housing body 21, as illustrated in the table of FIG. 4B.

When the signals from the first sensor AS1 and the third sensor AS3 are LOW and the signal from the second sensor AS2 is HIGH, the controller 100 determines that the second film unit FU2 is currently mounted on the housing body 21.

When the signals from the second sensor AS2 and the third sensor AS3 are LOW and the signal from the first sensor AS1 is HIGH, the controller 100 determines that the third film unit FU3 is currently mounted on the housing body 21.

When the signals from the first sensor AS1, the second sensor AS2, and the third sensor AS3 are all HIGH, the controller 100 determines that none of the first film unit FU1, the second film unit FU2, and the third film unit FU3 are mounted on the housing body 21.

Referring to FIG. 5, there will be explained cases in which the sheets of different widths are placed on the foil transfer apparatus 1. As illustrated in FIG. 5, the foil transfer apparatus 1 includes a first sheet sensor SS1 and a sheet width sensor SS4.

As illustrated in FIG. 1, the first sheet sensor SS1 is disposed between the pickup roller 11A and the transfer device 50 in the conveying direction. As illustrated in FIG. 5, the first sheet sensor SS1 is located on a center line C in the width direction of the sheet S, i.e., in the right-left direction in FIG. 5. The first sheet sensor SS1 is capable of detecting passage of the sheet S conveyed toward the transfer device 50. The first sheet sensor SS1 transmits an ON signal to the controller 100 in a time period during which the first sheet sensor SS1 is detecting the sheet S.

The sheet width sensor SS4 is disposed between the pickup roller 11A and the transfer device 50 in the conveying direction. As illustrated in FIG. 5, the sheet width sensor SS4 is capable of detecting the sheet S that is conveyed toward the transfer device 50 so as to pass the one-side shifted region. In the present embodiment, the sheet width sensor SS4 is disposed in the one-side shifted region R3 and is located more upstream than the first sheet sensor SS1 in the conveying direction by a slight distance. The sheet width sensor SS4 is located so as to be shifted from the center line C to one side in the width direction of the sheet S, i.e., in the right-left direction in FIG. 5. The sheet width sensor SS4 transmits an ON signal to the controller 100 in a time period during which the sheet width sensor SS4 is detecting the sheet S.

In the present embodiment, the sheet width sensor SS4 is located at a position that is shifted to the left side in FIG. 5 from the center line C by 75-77 mm.

In a case where a sheet S1 having a width larger than a width of an A5-size sheet (whose width is 148.5 mm) is conveyed in the center alignment manner, the sheet width sensor SS4 can detect the sheet S1.

In a case where a sheet S2 having a width of not larger than the width of the A5 size sheet (whose width is 148.5 mm) is conveyed in the center alignment manner, the sheet width sensor SS4 cannot detect the sheet S2.

Next, the lock mechanism 8 that locks the cover 22 is explained in detail.

Figure 6A:
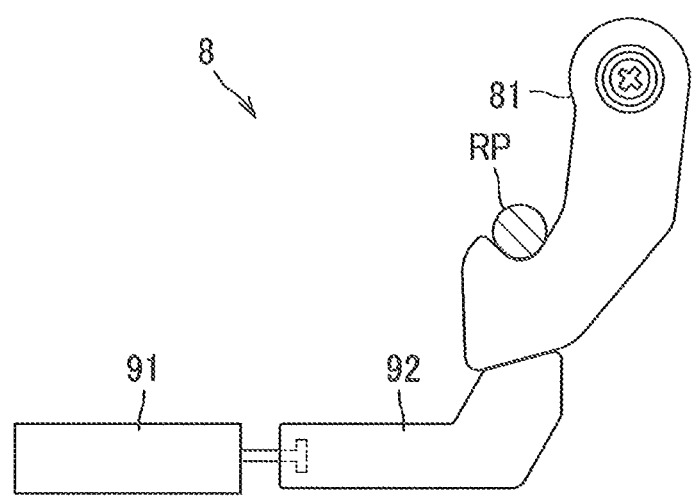
FIG. 6A is a side view of a lock lever and components therearound, the view illustrating a state in which the lock lever is located at a locking position so as to be prohibited from swinging.

As illustrated in FIG. 6A, the lock mechanism 8 includes lock levers 81, actuators 91, lever-swing prohibiting members 92, and lock pins RP. In the present embodiment, the lock levers 81 are provided at a front end portion of the cover 22 while the actuators 91, the lever-swing prohibiting members 92, and the lock pins RP are provided on the housing body 21, as illustrated in FIG. 2.

Each lock lever 81 is swingable between a locking position (FIG. 6A) at which the lock lever 81 locks the cover 22 at the closed position and a non-locking position (FIG. 6C) at which the lock lever 81 does not lock the cover 22.

Figure 7:
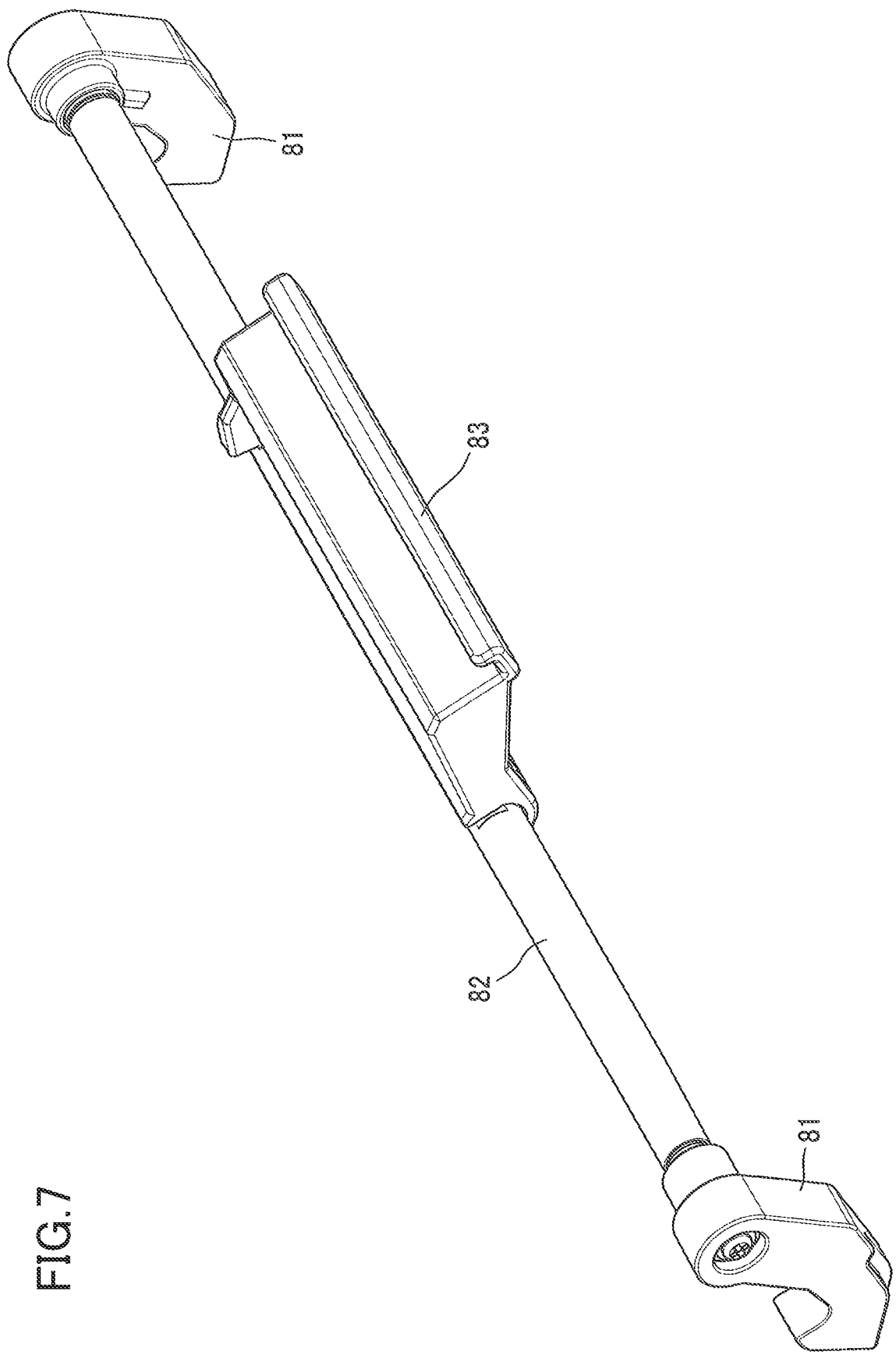
FIG. 7 is a perspective view of the lock levers.

As illustrated in FIG. 7, the lock levers 81 are respectively provided at opposite ends of a cylindrical shaft 82. The shaft 82 is rotatably supported by the cover 22. A handle 83, which is operable by a user, is provided at an axially middle portion of the shaft 82. The lock levers 81 and the handle 83 are fixed to the shaft 82. In this arrangement, when the user pivots the handle 83, the lock levers 81 are pivoted together with the shaft 82.

As illustrated in FIG. 6A, the lock lever 81 has a distal portion shaped like a hook. The hook-like distal portion of the lock lever 81 is engageable with the lock pin RP. In a state in which the cover 22 is located at the closed position, the lock lever 81 is movable between the locking position (FIG. 6A) at which the lock lever 81 is engageable with the lock pin RP and the non-locking position (FIG. 6C) at which the lock lever 81 is disengaged from the lock pin RP.

Figure 6B:
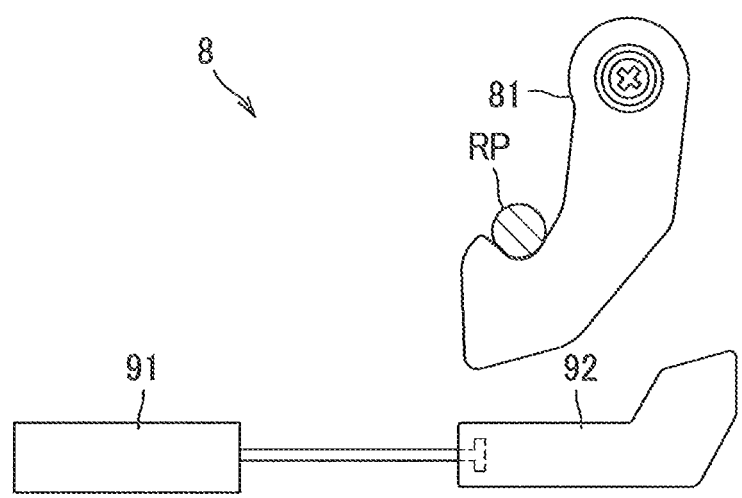
FIG. 6B is a side view of the lock lever and the components therearound, the view illustrating a state in which the lock lever is not prohibited from swinging.
Figure 6C:
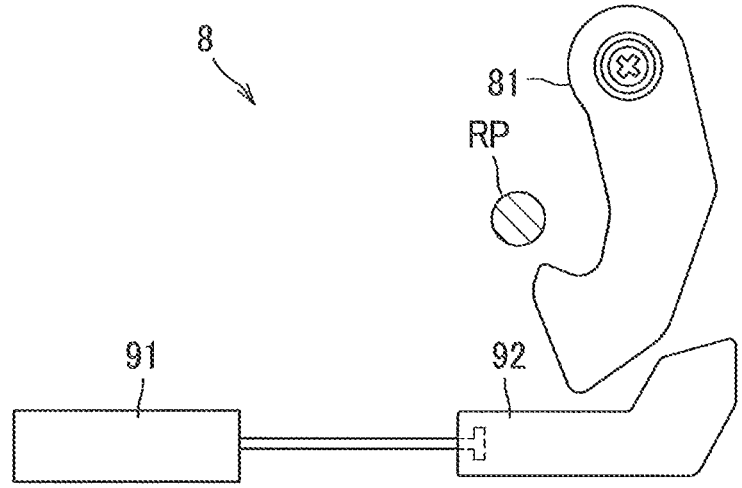
FIG. 6C is a view of the lock lever and the components therearound, the view illustrating a state in which the lock lever swings to a non-locking position.

The lever-swing prohibiting member 92 is movable between a prohibiting position (FIG. 6A) and a non-prohibiting position (FIGS. 6B and 6C). As illustrated in FIG. 6A, the lever-swing prohibiting member 92 contacts the lock lever 81 at the prohibiting position so as to prohibit the lock lever 81 from swinging from the locking position to the non-locking position.

As illustrated in FIGS. 6B and 6C, the lever-swing prohibiting member 92 is spaced apart from the lock lever 81 at the non-prohibiting position so as to allow the lock lever 81 to swing from the locking position to the non-locking position.

The actuator 91 is configured to slidably move the lever-swing prohibiting member 92 between the prohibiting position and the non-prohibiting position.

There will be next explained in detail a heating unit 6 having the heating roller 61.

As illustrated in FIG. 1, the heating roller 61 is supported by the heating unit 6 so as to be rotatable and movable in the up-down direction. The heating unit 6 is disposed between the supply reel 31 and the take-up reel 35 in the conveying direction. The heating unit 6 includes the roller-position change mechanism 7, a fixed frame 60, a shutter 62, link mechanisms 63, a temperature sensor 66, and a metal plate 67.

The roller-position change mechanism 7 includes a movable frame 70 and cams 73. The movable frame 70 is a member that directly supports the heating roller 61. The movable frame 70 is slidably guided by a guide portion (not illustrated) of the fixed frame 60. Each cam 73 is a member that moves, by its rotation, the movable frame 70 in the up-down direction.

Figure 8:
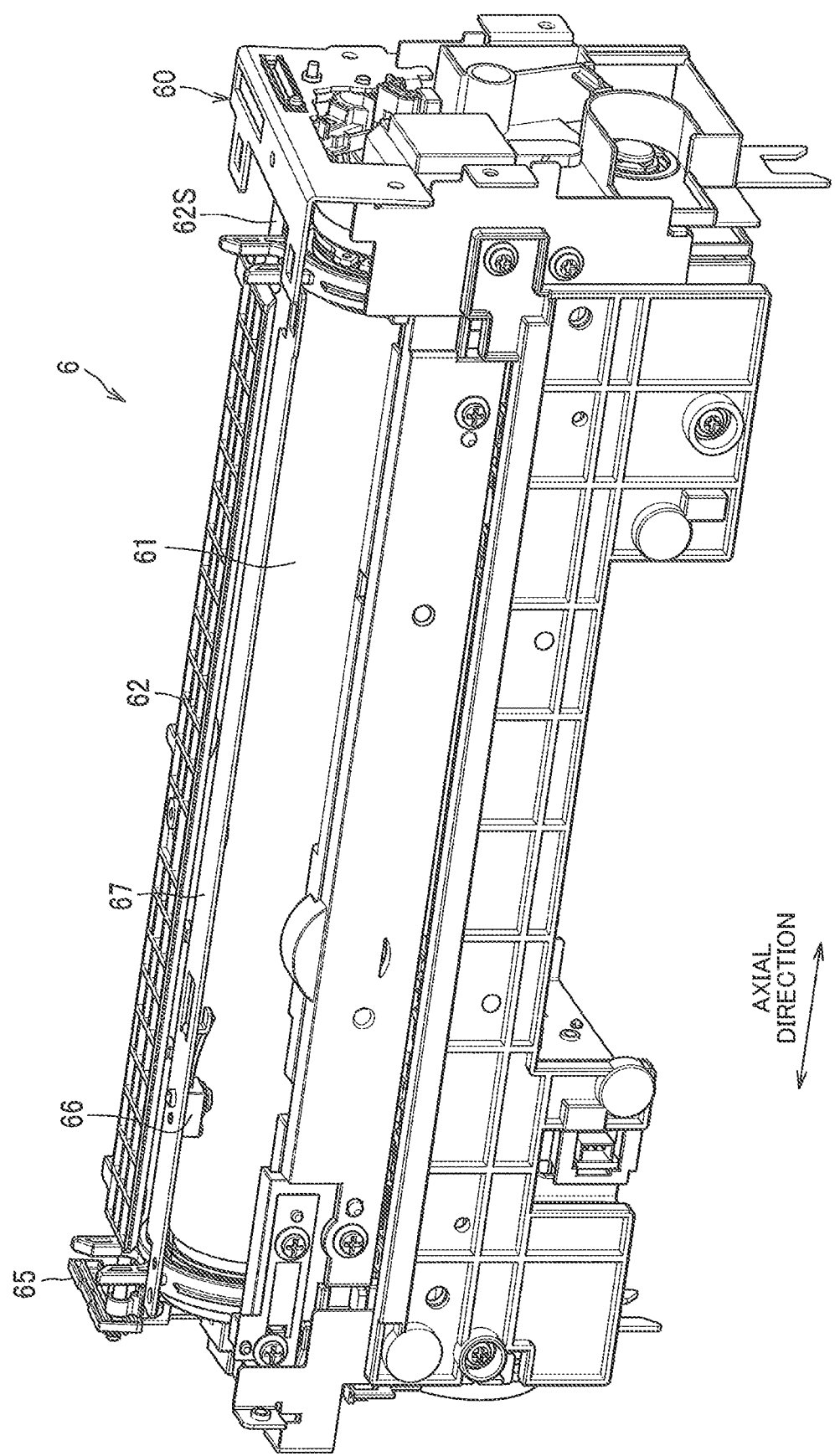
FIG. 8 is a perspective view of a heating unit.

As illustrated in FIG. 8, the fixed frame 60 constitutes an outer frame of the heating unit 6 and supports the roller-position change mechanism 7. The fixed frame 60 is fixed to the housing body 21.

The shutter 62 is slidably supported by shutter guides 65 that will be described so as to be movable between a first position illustrated in FIG. 9B and a second position illustrated in FIG. 9A. The shutter 62 moves between the first position and the second position in conjunction with the motion of the roller-position change mechanism 7.

Figure 9A:
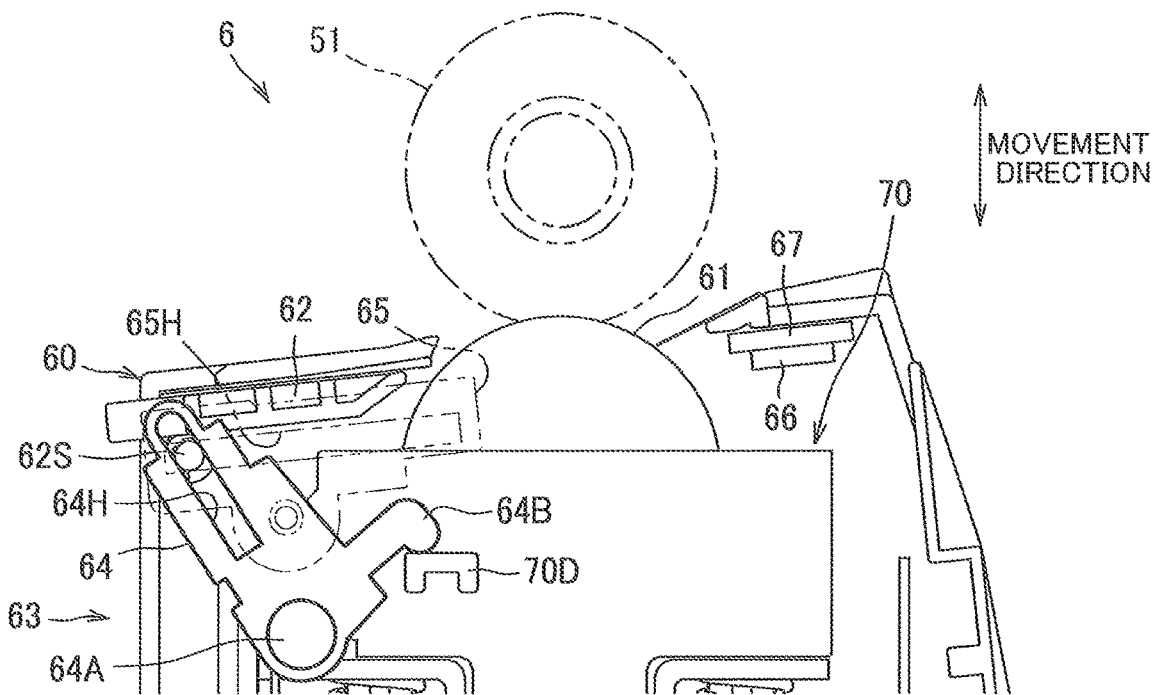
FIG. 9A is a view for explaining a shutter and a link mechanism in a state in which a heating roller is located at a press-contact position.
Figure 9B:
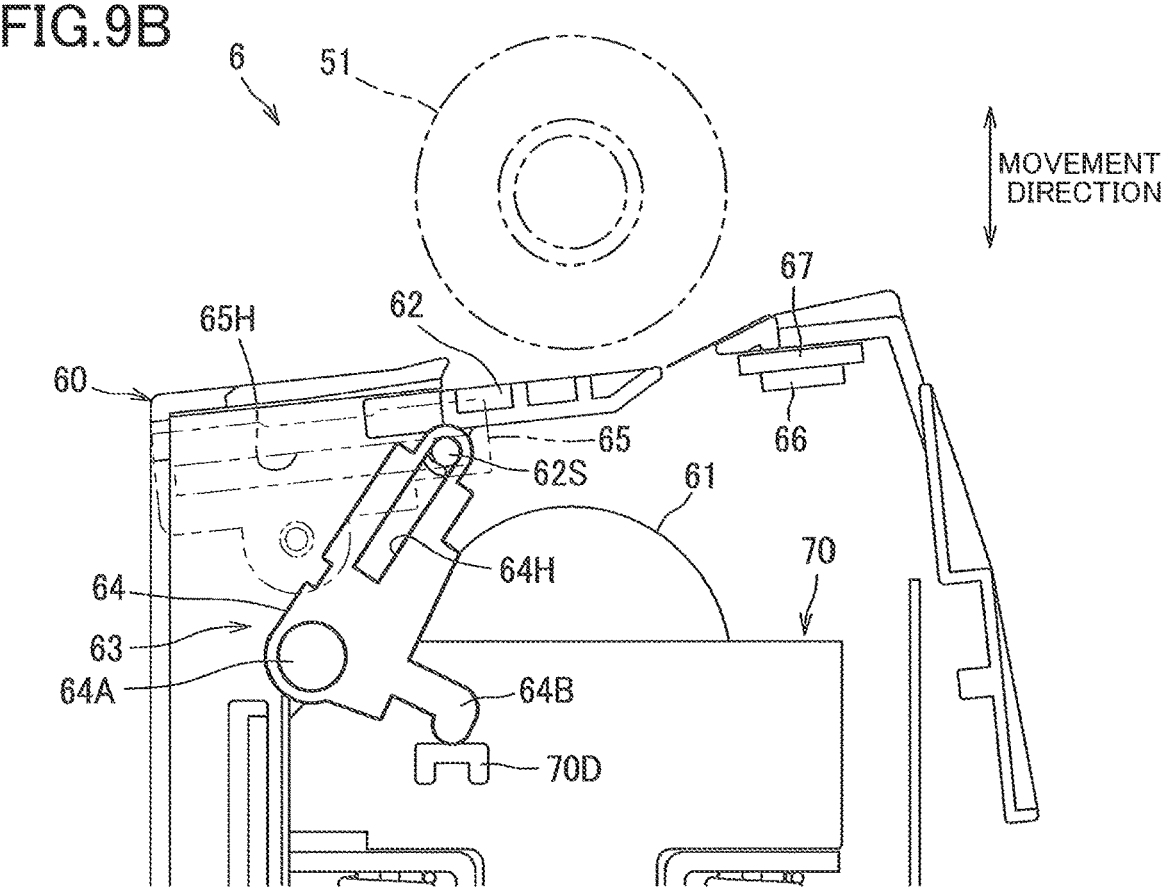
FIG. 9B is a view for explaining the shutter and the link mechanism in a state in which the heating roller is located at a spaced position.

As illustrated in FIG. 9B, the first position of the shutter 62 is a position which is between the heating roller 61 and the pressure roller 51 and at which the shutter 62 covers the heating roller 61 when the heating roller 61 is located at the spaced position.

As illustrated in FIG. 9A, the second position of the shutter 62 is a position which is different from the first position and to which the shutter 62 is retracted toward the upstream side in the conveying direction when the heating roller 61 is located at the press-contact position.

Each of the link mechanisms 63 is a mechanism for moving the shutter 62 in conjunction with the movement of the movable frame 70. Specifically, as illustrated in FIGS. 9A and 9B, when the movable frame 70 moves from an upper position at which the heating roller 61 is located at the press-contact position to a lower position at which the heating roller 61 is located at the spaced position, the link mechanism 63 causes the shutter 62 to be moved from the open position (the second position) to the closed position (the first position). As illustrated in FIG. 8, when the movable frame 70 moves from the lower position at which the heating roller 61 is located at the spaced position to the upper position at which the heating roller 61 is located at the press-contact position, the link mechanism 63 causes the shutter 62 to be moved from the closed position to the open position.

Each link mechanism 63 includes a link 64 and the shutter guide 65. The following explanation will be made focusing on one of the link mechanisms 63. The link 64 is swingably supported by the fixed frame 60. The link 64 is swingable between a third position illustrated in FIG. 9A and a fourth position illustrated in FIG. 9B. The link 64 has a shaft 64A, an arm 64B, and an elongate hole 64H. The link 64 is always urged by a torsion spring (not illustrated) toward the fourth position, namely, in a direction in which the shutter 62 is closed.

The shaft 64A is supported by the fixed frame 60. The link 64 swings about the axis of the shaft 64A. The arm 64B is a portion that is in contact with a corresponding one of protrusions 70D provided on the movable frame 70. The shaft 62S of the shutter 62 is engaged in the elongate hole 64H.

The shutter guide 65 is fixed to the fixed frame 60 and has an elongate hole 65H. The elongate hole 65H guides the movement of the shaft 62S of the shutter 62.

The metal plate 67 is disposed downstream of the heating roller 61 in the conveying direction. The metal plate 67 is fixed to the fixed frame 60 so as to extend in the width direction of the foil film F (hereinafter simply referred to as "width direction" where appropriate). The metal plate 67 is opposed to the heating roller 61.

The temperature sensor 66 is disposed on a lower surface of the metal plate 67. That is, the temperature sensor 66 is provided on one of opposite surfaces of the metal plate 67 that is closer to the heating roller 61. As illustrated in FIG. 5, the temperature sensor 66 is located in an overlapping region in which the region R2 (in which the second foil film F2 is mounted) and the region R3 (in which the third foil film F3 is mounted) overlap, so as to be closer to one of widthwise opposite ends of the second foil film F2 (i.e., the left end of the region R2 in FIG. 5) than a widthwise center thereof. The temperature sensor 66 is located so as to be closer to the sheet width sensor SS4 than the first sheet sensor SS1 in the width direction, i.e., in the right-left direction in FIG. 5.

There will be next explained a case in which the controller 100 controls the lock mechanism 8 to lock the cover 22 (lock: ON) and a case in which the controller 100 controls the lock mechanism 8 to unlock the cover 22 (lock: OFF). When the cover 22 is locked, the user cannot open the cover 22. When the cover 22 is unlocked, the user can open the cover 22 by pivoting the handle 83.

When the shutter 62 is located at the second position, the controller 100 controls the lock mechanism 8 to lock the cover 22, and the cover 22 is kept locked, namely, the cover 33 is not unlocked, regardless of a detection temperature T detected by the temperature sensor 66. As described above, the shutter 62 is moved to the second position in conjunction with the motion of the roller-position change mechanism 7. Accordingly, when the shutter 62 is located at the second position, the heating roller 61 is located at the press-contact position. That is, a case in which the shutter 62 is located at the second position means a case in which the heating roller 61 is located at the press-contact position. In this case, the foil transfer operation is being performed. Thus, the controller 100 does not unlock the cover 22.

Figure 10:
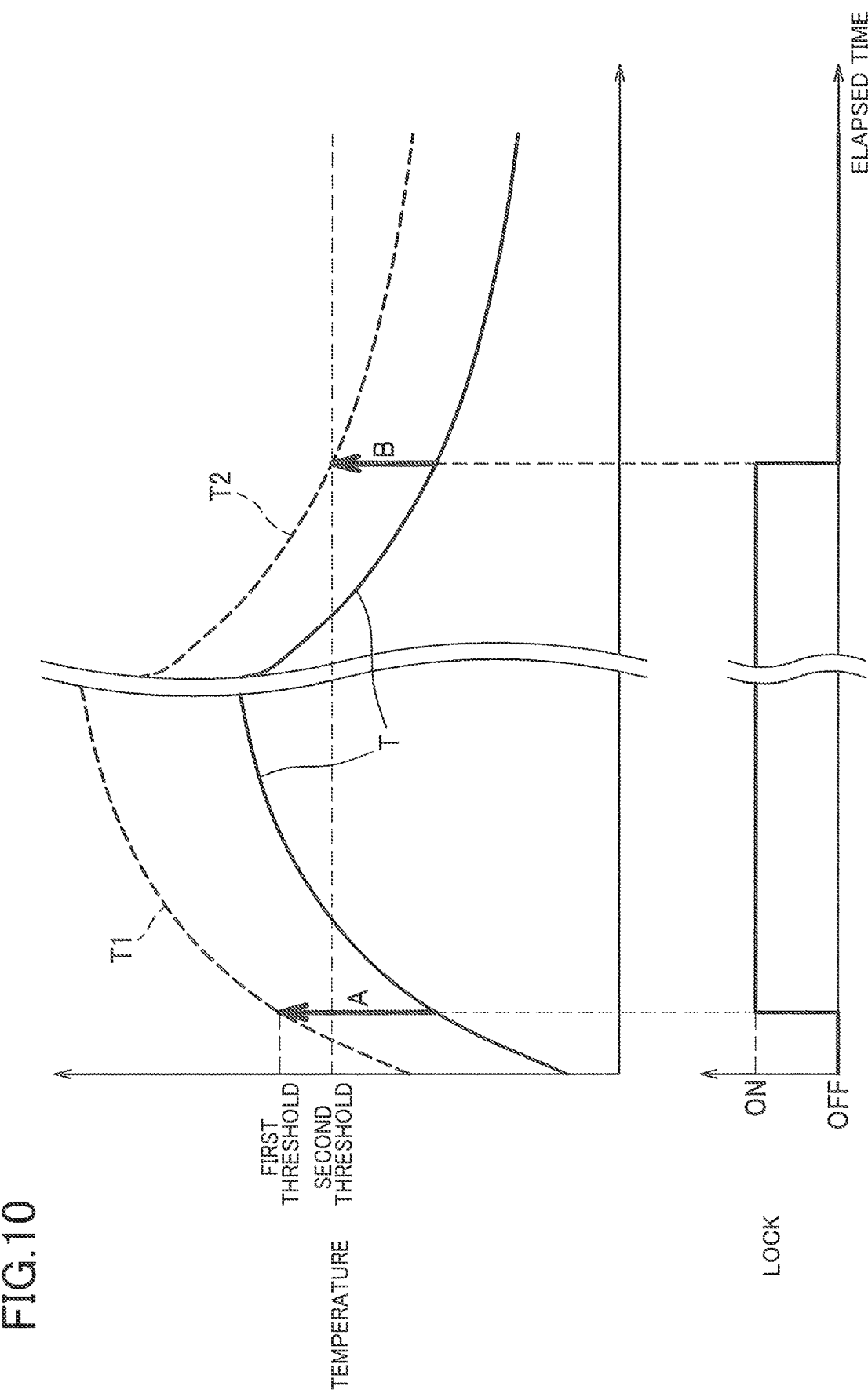
FIG. 10 is a graph for explaining i) a value obtained by adding a first correction value to a detection temperature and timing of locking the cover and ii) a value obtained by adding a second correction value to the detection temperature and timing of unlocking the cover.

In the graph of FIG. 10, the detection temperature T detected by the temperature sensor 66 is indicated by the solid line. As illustrated in FIG. 10, the controller 100 calculates, as a first lock determination temperature T1, a value obtained by adding a first correction value A determined based on a condition for performing the foil transfer operation to the detection temperature T detected by the temperature sensor 66. The first lock determination temperature T1 (T1=T+A) is indicated by the dashed line in FIG. 10. When the first lock determination temperature T1 is not lower than a first threshold, the controller 100 controls the lock mechanism 8 to lock the cover 22. The first correction value A is a value determined in advance according to experimental results based on the operating condition of the foil transfer apparatus 1, namely, based on the condition for performing the foil transfer operation. The first threshold is a value determined in advance based on specifications of the foil transfer apparatus 1. The first threshold is 85° C., for instance.

The controller 100 calculates, as a second lock determination temperature T2, a value obtained by adding a second correction value B determined based on the condition for performing the foil transfer operation to the detection temperature T detected by the temperature sensor 66. The second lock determination temperature T2 (T2=T+B) is indicated by the dashed line in FIG. 10. When the second lock determination temperature T2 is lower than a second threshold, the controller 100 controls the lock mechanism 8 to unlock the cover 22. The second correction value B is a value determined in advance according to experimental results based on the operating condition of the foil transfer apparatus 1, namely, based on the condition for performing the foil transfer operation. The second correction value B is different from the first correction value A.

The first threshold is higher than the second threshold. The first threshold is a temperature value higher than a temperature value of the second threshold by 5-15° C. The second threshold is 75° C., for instance.

The controller 100 changes the first correction value A and the second correction value B depending on the type of the foil film F mounted on the foil transfer apparatus 1, the width of the sheet S, the thickness of the sheet S, the selected foil transfer mode, etc. For instance, the controller 100 determines the first correction value A and the second correction value B according to tables determined in advance based on experimental results, as illustrated in FIGS. 11 and 12.

Specifically, as illustrated in FIG. 11, when the first foil film F1 is mounted on the foil transfer apparatus 1, the controller 100 determines the first correction value A and the second correction value B to be A1 and B1, respectively.

When the second foil film F2 is mounted on the foil transfer apparatus 1, the controller 100 determines the first correction value A to be A2 that is greater than A1 and determines the second correction value B to be B2 that is greater than B1. That is, the first correction value A and the second correction value B when the second foil film F2 is mounted are determined to be greater than those when the first foil film F1 is mounted (A2>A1, B2>B1).

When the third foil film F3 is mounted on the foil transfer apparatus 1, the controller 100 determines the first correction value A to be A3 that is greater than A1 and less than A2 and determines the second correction value B to be B3 that is greater than B1 and less than B2. That is, the first correction value A and the second correction value B when the third foil film F3 is mounted are determined to be greater than those when the first foil film F1 is mounted and less than those when the second foil film F2 is mounted (A2>A3>A1, B2>B3>B1).

In the present embodiment, in response to reception of the signals from the first sensor AS1, the second sensor AS2, and the third sensor AS3, the controller 100 can determine which one of the first film unit FU1, the second film unit FU2, and the third film unit FU3 is currently mounted on the housing body 21. This configuration enables the first correction value A and the second correction value B to be determined without a need of inputting the width of the foil film F by the user.

When the sheet S having the first width is mounted on the foil transfer apparatus 1, the controller 100 determines the first correction value A and the second correction value B to be A4 and B4, respectively, as illustrated in FIG. 12A. When the sheet S having the second width larger than the first width is mounted on the foil transfer apparatus 1, the controller 100 determines the first correction value A to be A5 that is less than A4 and determines the second correction value B to be B5. That is, the first correction value A when the width of the sheet S is the first width is determined to be A4 that is greater than the value (A5) determined when the width of the sheet S is the second width larger than the first width (A4>A5). In the present embodiment, the second correction value B4 and the second correction value B5 are the same value (B4=B5).

In the present embodiment, the sheet having the first width is an A5 size sheet (whose width is 148.5 mm), and the sheet having the second width is an A4 size sheet (whose width is 210 mm). In the present embodiment, in a case where the sheet is conveyed in the center alignment manner, the controller 100 can determine whether the sheet being conveyed has a width of not larger than the width of the A5 size sheet or a width of not smaller than the width of the A5 size sheet, based on the signal transmitted from the sheet width sensor SS4. This configuration enables the first correction value A and the second correction value B to be determined without a need of inputting the width of the sheet S by the user.

When the sheet S having the first thickness is mounted on the foil transfer apparatus 1, the controller 100 determines the first correction value A and the second correction value B to be A6 and B6, respectively, as illustrated in FIG. 12B. When the sheet S having the second thickness larger than the first thickness is mounted on the foil transfer apparatus 1, the controller 100 determines the first correction value A to be A7 that is less than A6 and determines the second correction value B to be B7. That is, the first correction value A when the thickness of the sheet S is the first thickness is determined to be A6 that is greater than the value (A7) determined when the thickness of the sheet S is the second thickness larger than the first thickness (A6>A7). In the present embodiment, the second correction value B6 and the second correction value B7 are the same value (B6=B7).

The controller 100 is configured to execute two foil transfer modes, i.e., a normal mode in which the foil transfer operation is performed such that the foil film is brought into contact with an entire region of the sheet in the conveying direction of the sheet S and a foil save mode in which the foil transfer operation is performed such that the foil film is brought into contact with a part of the sheet in the conveying direction. It is noted that the normal mode includes a case in which the foil film F is brought into pressing contact with only a part of the sheet S in the width direction.

When the controller 100 executes the normal mode, the controller determines the first correction value A and the second correction value B to be A8 and B8, respectively, as illustrated in FIG. 12C. When the controller 100 executes the foil save mode, the controller 100 determines the first correction value A to be A9 that is greater than A8 and determines the second correction value B to be B9 that is greater than B8. That is, the first correction value A and the second correction value B when the controller 100 executes the foil save mode are determined to be A9 and B9, respectively, that are greater than the respective values (A8, B8) determined when the controller 100 executes the normal mode.

In a case where there exist a plurality of conditions for performing the foil transfer operation such as the type of the foil film F mounted on the foil transfer apparatus 1, the width of the sheet S, the thickness of the sheet S, and the selected foil transfer mode, the controller 100 determines the first correction value A and the second correction value B as follows. That is, the controller 100 determines, as the first correction value A, an average value of the plurality of first correction values A selected from the tables of FIGS. 11 and 12 and determines, as the second correction value B, an average value of the plurality of second correction values B selected from the tables of FIGS. 11 and 12. In a case where the foil film F is the first foil film F1, the sheet S has the first width and the first thickness, and the foil transfer mode is the normal mode, for instance, the controller 100 determines the first correction value A by averaging A1, A4, A6, and A8.

The configuration illustrated in the present embodiment enjoys the following advantages.

In the foil transfer apparatus 1, the cover 22 can be opened so as to enable replacement of the foil film F and removal of a jammed sheet S. The temperature in the foil transfer apparatus 1 may be high after the foil transfer operation has been performed. Accordingly, the controller 100 executes a control of locking the cover 22 such that the cover 22 cannot be opened until the temperature becomes equal to or lower than a predetermined temperature.

The controller 100 controls the heating roller 61 and the pressure roller 51 to be held in pressing contact with each other in a time period during which the foil transfer operation is being performed. Thus, the shutter 62 configured to cover the heating roller 61 is retracted to the second position, i.e., the open position, in the time period during which the foil transfer operation is being performed. If the cover 22 is not locked during the foil transfer operation, the cover 22 may be opened, causing a possibility that the user touches the heating roller 61. In the present embodiment, therefore, the cover 22 is not unlocked, namely, the cover 22 is kept locked, during the foil transfer operation, regardless of the temperature in the foil transfer apparatus 1.

Further, even if the foil transfer operation is not being performed, the cover 22 is not unlocked when the temperature of the shutter 62 that covers the heating roller 61 is high. In the present embodiment, the temperature of the shutter 62 is estimated, and the lock mechanism 8 is controlled based on the estimated temperature without providing the temperature sensor for the shutter 62.

Specifically, the controller 100 calculates, as the first lock determination temperature T1, a value (T+A) obtained by adding the first correction value A determined based on the condition for performing the oil transfer operation to the detection temperature T detected by the temperature sensor 66. When the first lock determination temperature T1 is not lower than the first threshold, the controller 100 controls the lock mechanism 8 to lock the cover 22. The controller 100 calculates, as the second lock determination temperature T2, a value (T+B) obtained by adding the second correction value B different from the first correction value A to the detection temperature T detected by the temperature sensor 66. When the second lock determination temperature T2 is lower than the second threshold, the controller 100 controls the lock mechanism 8 to unlock the cover 22.

In other words, the first lock determination temperature T1 is an estimated temperature of the shutter 62 when the heating roller 61 is in an ON state while the second lock determination temperature T2 is an estimated temperature of the shutter 62 when the heating roller 61 is in an OFF state.

With this configuration, the first lock determination temperature T1 used for making a determination to lock the cover 22 and the second lock determination temperature T2 used for making a determination to unlock the cover 22 are determined by adding the respective appropriate correction values (i.e., the first correction value A and the second correction value B) to the detection temperature T. In this configuration, the locked state and the unlocked state of the cover 22 can be appropriately established with respect to the condition for performing the foil transfer operation. This configuration prevents the cover 22 from being kept in the locked state longer than necessary, thus enhancing convenience for users. Further, this configuration enables the temperature of the shutter 62 to be estimated without providing the temperature sensor 66 for the shutter 62.

The first correction value A and the second correction value B when the second foil film F2 is mounted are determined to be A2 and B2, respectively, that are greater than the values (A1, B1) when the first foil film F1 is mounted. As illustrated in FIG. 5, the air is more likely to pass in the neighborhood of the sensor 66 when the second foil film F2 is mounted than when the first foil film F1 is mounted. In this case, a portion of the metal plate 67 in the neighborhood of the sensor 66 is likely to be cooled, as compared with other portion thereof. Accordingly, the first correction value A and the second correction value B when the second foil film F2 is mounted are preferably determined to be A2 and B2, respectively, that are greater than the values (A1, B1) when the first foil film F1 is mounted.

The first correction value A and the second correction value B when the third foil film F3 is mounted are determined to be A3 and B3, respectively, that are greater than the values (A1, B1) when the first foil film F1 is mounted and less than the values (A2, B2) when the second foil film F2 is mounted.

As illustrated in FIG. 5, the first foil film F1 is a film having a large width. (See the region R1.). Accordingly, both the shutter 62 and the metal plate 67 are less likely to be cooled. As illustrated in FIG. 5, when the third foil film F3 is mounted, a right half portion of the metal plate 67 in which the sensor 66 is not located is likely to be cooled whereas a left half portion of the metal plate 67 in which the sensor 66 is located is less likely to be cooled. Accordingly, the first correction value A and the second correction value B when the third foil film F3 is mounted are determined to be A3 and B3, respectively, that are greater than the values (A1, B1) when the first foil film F1 is mounted and less than the values (A2, B2) when the second foil film F2 is mounted.

Thus, the first correction value A and the second correction value B are determined to be values corresponding to any one of the first foil film F1, the second foil film F2, and the third foil film F3 currently mounted on the foil transfer apparatus 1, so that the locked state and the unlocked state of the cover 22 can be appropriately established. Consequently, the cover 22 is prevented from being kept in the locked state longer than necessary, thus enhancing convenience for users.

The first correction value A when the width of the sheet S is the first width that is narrow is determined to be greater than that when the width of the sheet S is the second width that is wide. In a case where the width of the sheet S is narrow, the temperature of the metal plate 67 is low with respect to the temperature of the shutter 62, resulting in a large difference in temperature between the shutter 62 and the metal plate 67. In view of this, the correction value is desirably determined to be a greater value.

Thus, the first correction value A is determined to be a value corresponding to the width of the sheet S (the first width or the second width), so that the locked state and the unlocked state of the cover 22 can be appropriately established. Consequently, the cover 22 is prevented from being kept in the locked state longer than necessary, thus enhancing convenience for users.

The first correction value A when the thickness of the sheet S is the first thickness that is small is determined to be greater than that when the thickness of the sheet S is the second thickness larger than the first thickness. In a case where the thickness of the sheet S is small, the temperature of the metal plate 67 is low with respect to the temperature of the shutter 62, resulting in a large difference in temperature between the shutter 62 and the metal plate 67. In view of this, the correction value is desirably determined to be a greater value.

Thus, the first correction value A is determined to be a value corresponding to the thickness of the sheet S (the first thickness or the second thickness), so that the locked state and the unlocked state of the cover 22 can be appropriately established. Consequently, the cover 22 is prevented from being kept in the locked state longer than necessary, thus enhancing convenience for users.

The first correction value and the second correction value when the foil save mode is executed are determined to be greater than those when the normal mode is executed. In a case where the foil save mode is executed, the temperature of the metal plate 67 is low with respect to the temperature of the shutter 62, as compared with a case where the normal mode is executed, resulting in a large difference in temperature between the shutter 62 and the metal plate 67. In view of this, the correction value is desirably determined to be a greater value.

Consequently, the first correction value A and the second correction value B are determined to be values corresponding to the foil transfer mode (the normal mode or the foil save mode), so that the locked state and the unlocked state of the cover 22 can be appropriately established. Consequently, the cover 22 is prevented from being kept in the locked state longer than necessary, thus enhancing convenience for users.

Provision of a difference that is equal to a temperature value of 5-15° C. between the first threshold and the second threshold prevents or reduces a frequent changeover between locking and unlocking of the cover 22.

The cover can be unlocked only when the shutter is located at the first position at which the shutter coves the heating member, thus preventing or reducing a possibility that the user touches the heating member.

The temperature sensor 66 is provided on the metal plate 67. Accordingly, the temperature sensor 66 can detect the temperature corresponding to the state of the heating roller 61.

It is to be understood that the present disclosure is not limited to the details of the illustrated embodiment but may be embodied in various forms described below, for instance.

In the illustrated embodiment, the controller 100 calculates, as the first lock determination temperature T1, a value obtained by adding the first correction value A determined based on the condition for performing the foil transfer operation to the detection temperature T detected by the temperature sensor 66. When the first lock determination temperature T1 is not lower than the first threshold, the controller 100 controls the lock mechanism to lock the cover. The controller 100 calculates, as the second lock determination temperature T2, a value obtained by adding the second correction value B to the detection temperature T detected by the temperature sensor 66. When the second lock determination temperature T2 is lower than the second threshold, the controller 100 controls the lock mechanism to unlock the cover. The present disclosure is not limited to this configuration.

When the detection temperature T detected by the temperature sensor 66 is not lower than a value obtained by subtracting a third correction value D determined based on the condition for performing the foil transfer operation from a third threshold, the controller 100 may lock the cover 22. When the detection temperature T detected by the temperature sensor 66 is lower than a value obtained by subtracting a fourth correction value E determined based on the condition for performing the foil transfer operation from a fourth threshold, the controller 100 may unlock the cover 22.

In the modification above, the value used for making a determination to lock the cover 22 and the value used for making a determination to unlick the cover 22 are determined by subtracting the respective different correction values from the respective thresholds. With this configuration, the locked state and the unlocked state of the cover 22 can be appropriately established with respect to the condition for performing the foil transfer operation. Consequently, the cover 22 is prevented from being kept in the locked state longer than necessary, thus enhancing convenience for users.

In the illustrated embodiment, the lock levers are provided at the front end portion of the cover while the actuators, the lever-swing prohibiting members, and the lock pins are provided on the housing body. The lock levers may be provided on the housing body while the actuators, the lever-swing prohibiting members, and the lock pins may be provided on the cover.

In the illustrated embodiment, the controller is configured to determine the width of the foil film and the width of the sheet S based on the signals transmitted from the sensors. The controller may be configured to determine the width of the foil film and the width of the sheet S based on information input by the user.

In the illustrated embodiment, the second correction values B4 and B5 are the same value (B4=B5), and the second correction values B6 and B7 are the same value (B6=B7). The second correction values B4 and B5 may be mutually different values, and the second correction values B6 and B7 may be mutually different values.

In the illustrated embodiment, the first correction value A and the second correction value B are determined based on the condition for performing the foil transfer operation such as the type of the foil film F, the width of the sheet S, the thickness of the sheet S, or the foil transfer mode (i.e., the normal mode or the foil save mode). The present disclosure is not limited to this configuration.

For instance, the controller may determine the first correction value A and the second correction value B based on the length of the sheet S in the conveying direction, the conveying speed of the sheet S (such as a full speed or a half speed), the temperature of the heating roller set for fixation, the length of time during which the foil transfer operation is continuously performed, or the environmental conditions of the apparatus such as the ambient temperature and the humidity.

In the illustrated embodiment, the controller 100 determines the first correction value A and the second correction value B according to the tables corresponding to the respective conditions. The controller 100 may determine the first correction value A and the second correction value B according to computational expressions determined in advance.

In the illustrated embodiment, the movable frame 70 is pushed by the cams 73 so as to move from the lower position at which the heating roller 61 is located at the spaced position to the upper position at which the heating roller 61 is located at the press-contact position. The present disclosure is not limited to this configuration. The movable frame 70 may move from the lower position at which the heating roller 61 is located at the spaced position to the upper position at which the heating roller 61 is located at the press-contact position by being pushed by other member such as a solenoid actuator.

In the illustrated embodiment, the pressure roller 51 is illustrated as the pressurizing member, and the heating roller 61 is illustrated as the heating member. The present disclosure is not limited to this configuration. For instance, the pressurizing member may be a pad or the like that cooperates with the heating roller to nip the sheet and the foil film therebetween. The heating member may be a plate-like member that cooperates with the pressure roller to nip the sheet and the foil film therebetween.

In the illustrated embodiment, a shaft 42 (FIG. 1) shaped like a roller constitutes a separating member that changes the moving direction of the foil film F that has passed the transfer device 50 to a direction different from the conveying direction of the sheet S, thus permitting the foil film F to be peeled off from the sheet S.

In the illustrated embodiment, a shaft 43 (FIG. 1) shaped like a roller constitutes an angle defining member for defining the moving direction of the foil film F that is changed by the shaft 42.

In the illustrated embodiment, the supply reel 31 and the take-up reel 35 constitute a foil-transfer film cartridge FC. The present disclosure is not limited to this configuration. For instance, the foil-transfer film cartridge may include the supply reel, and the take-up reel may be provided in the housing.

In the illustrated embodiment, the foil transfer apparatus is configured to transfer the foil onto the toner image formed on the sheet. The present disclosure is not limited to this configuration. The foil transfer apparatus may have any structure provided that the apparatus is configured to transfer the foil to the sheet.

In the illustrated embodiment, the foil film F is constituted by the four layers. The present disclosure is not limited to this configuration. The number of layers that constitute the foil film may be optional provided that the foil film includes the transfer layer and the supporting layer.

In the illustrated embodiment, the film unit is constituted by the foil-transfer film cartridge and a holder holding the foil-transfer film cartridge. The present disclosure is not limited to this configuration. The film unit need not necessarily include the holder. The holder may undetachably support the foil-transfer film cartridge.

The present disclosure may be embodied by optionally combining the elements described in the embodiment and the modifications.

What is claimed is:

1. A foil transfer apparatus configured to superpose a sheet on a foil film including a foil and to transfer the foil to the sheet, the foil transfer apparatus comprising:
    a housing body having an opening;
    a cover movable between a closed position at which the cover closes the opening and an open position at which the cover exposes the opening;
    a lock mechanism capable of locking the cover at the closed position;
    a heating member configured to heat the foil film and the sheet;
    a pressurizing member configured to cooperate with the heating member to nip the foil film and the sheet therebetween;
    a temperature sensor; and
    a controller,
    wherein the controller is configured to
        determine a first correction value based on one, or two or more of (i) a width of the foil film, (ii) a position on which the foil film is mounted, (iii) a width of the sheet, (iv) a thickness of the sheet, and (v) a foil transfer mode,
        calculate a first lock determination temperature and a second lock determination temperature, the first lock determination temperature being a value obtained by adding the first correction value to a detection temperature detected by the temperature sensor, the second lock determination temperature being a value obtained by adding a second correction value that is different from the first correction value to the detection temperature detected by the temperature sensor,
        control the lock mechanism to lock the cover when the first lock determination temperature is not lower than a first threshold, and
        control the lock mechanism to unlock the cover when the second lock determination temperature is lower than a second threshold.

2. The foil transfer apparatus according to claim 1, on which are mountable any of (i) a first foil film that is the foil film having a first width, (ii) a second foil film that is the foil film having a second width smaller than the first width, the second foil film being configured to be mounted in a central region that is located at a widthwise central portion of a region in which the first foil film is mounted, and (iii) a third foil film that is the foil film having the second width, the third foil film being configured to be mounted in a one-side shifted region that is shifted to one of widthwise opposite sides in the region in which the first foil film is mounted,
    wherein the temperature sensor is located in an overlapping region in which the central region and the one-side shifted region overlap, so as to be closer to one of widthwise opposite ends of the second foil film than a widthwise center thereof,
    wherein the first correction value and the second correction value when the second foil film is mounted are determined to be greater than the first correction value and the second correction value when the first foil film is mounted, and
    wherein the first correction value and the second correction value when the third foil film is mounted are determined to be greater than the first correction value and the second correction value when the first foil film is mounted and less than the first correction value and the second correction value when the second foil film is mounted.

3. The foil transfer apparatus according to claim 1, wherein the first correction value when a width of the sheet is a first width is determined to be greater than the first correction value when the width of the sheet is a second width larger than the first width.

4. The foil transfer apparatus according to claim 1, wherein the first correction value when a thickness of the sheet is a first thickness is determined to be greater than the first correction value when the thickness of the sheet is a second thickness larger than the first thickness.

5. The foil transfer apparatus according to claim 1, wherein the controller is configured to execute a normal mode in which the foil transfer operation is performed such that the foil film is brought into contact with an entire region of the sheet in a conveying direction of the sheet and a foil save mode in which the foil transfer operation is performed such that the foil film is brought into contact with a part of the sheet in the conveying direction, and
wherein the first correction value and the second correction value when the foil save mode is executed are determined to be greater than the first correction value and the second correction value when the normal mode is executed.

6. The foil transfer apparatus according to claim 1, wherein the first threshold is higher than the second threshold.

7. The foil transfer apparatus according to claim 6, wherein the first threshold is a temperature value higher than a temperature value of the second threshold by 5-15° C.

8. The foil transfer apparatus according to claim 1, further comprising:
a position change mechanism configured to move the heating member between a press-contact position at which the heating member is in pressing contact with the pressurizing member and a spaced position at which the heating member is spaced apart from the pressurizing member; and
a shutter configured to be moved in conjunction with a motion of the position change mechanism so as to be located at a first position which is a position between the heating member and the pressurizing member and at which the shutter covers the heating member when the heating member is located at the spaced position and so as to be located at a second position different from the first position when the heating member is located at the press-contact position,
wherein, when the shutter is located at the second position, the controller controls the lock mechanism to lock the cover and does not unlock the cover irrespective of the detection temperature detected by the temperature sensor.

9. The foil transfer apparatus according to claim 8, further comprising a metal plate opposed to the heating member and extending in a width direction of the foil film,
wherein the temperature sensor is disposed on the metal plate.

10. The foil transfer apparatus according to claim 1, wherein the heating member is a heating roller that is rotatable.

11. The foil transfer apparatus according to claim 1, wherein the pressurizing member is a pressure roller that is rotatable.

12. The foil transfer apparatus according to claim 1, wherein the lock mechanism includes:

a lock lever swingable between a locking position at which the lock lever locks the cover at the closed position and a non-locking position at which the lock lever does not lock the cover; and
a lever-swing prohibiting member movable between a prohibiting position for prohibiting the lock lever from swinging from the locking position to the non-locking position and a non-prohibiting position for allowing the lock lever to swing from the locking position to the non-locking position.

13. A foil transfer apparatus configured to superpose a sheet on a foil film including foil and to transfer the foil to the sheet, the foil transfer apparatus comprising:
a housing body having an opening;
a cover movable between a closed position at which the cover closes the opening and an open position at which the cover exposes the opening;
a lock mechanism capable of locking the cover at the closed position;
a heating member configured to heat the foil film and the sheet;
a pressurizing member configured to cooperate with the heating member to nip the foil film and the sheet therebetween;
a temperature sensor; and
a controller,
wherein the controller is configured to control the lock mechanism to lock the cover when a detection temperature detected by the temperature sensor is not lower than a value obtained by subtracting a third correction value from a third threshold and to control the lock mechanism to unlock the cover when the detection temperature detected by the temperature sensor is not lower than a value obtained by subtracting a fourth correction value from a fourth threshold, the third correction value being determined based on one, or two or more of (i) a width of the foil film, (ii) a position on which the foil film is mounted, (iii) a width of the sheet, (iv) a thickness of the sheet, and (v) a foil transfer mode.

14. The foil transfer apparatus according to claim 13, wherein the heating member is a heating roller that is rotatable.

15. The foil transfer apparatus according to claim 13, wherein the pressurizing member is a pressure roller that is rotatable.

16. The foil transfer apparatus according to claim 13, wherein the lock mechanism includes:
a lock lever swingable between a locking position at which the lock lever locks the cover at the closed position and a non-locking position at which the lock lever does not lock the cover; and
a lever-swing prohibiting member movable between a prohibiting position for prohibiting the lock lever from swinging from the locking position to the non-locking position and a non-prohibiting position for allowing the lock lever to swing from the locking position to the non-locking position.

17. A foil transfer apparatus configured to superpose a sheet on a foil film including foil and to transfer the foil to the sheet, the foil transfer apparatus comprising:
a housing body having an opening;
a cover movable between a closed position at which the cover closes the opening and an open position at which the cover exposes the opening;
a lock lever capable of locking the cover at the closed position;

a heating roller configured to heat the foil film and the sheet;

a pressurizing roller configured to cooperate with the heating member to nip the foil film and the sheet therebetween;

a temperature sensor; and a controller, wherein the controller is configured to determine a first correction value based on one, or two or more of (i) a width of the foil film, (ii) a position on which the foil film is mounted, (iii) a width of the sheet, (iv) a thickness of the sheet, and (v) a foil transfer mode, calculate a first lock determination temperature and a second lock determination temperature, the first lock determination temperature being a value obtained by adding the first correction value to a detection temperature detected by the temperature sensor, the second lock determination temperature being a value obtained by adding a second correction value that is different from the first correction value to the detection temperature detected by the temperature sensor, and control the lock lever to lock the cover when the first lock determination temperature is not lower than a first threshold and control the lock lever to unlock the cover when the second lock determination temperature is lower than a second threshold.

18. The foil transfer apparatus according to claim 17, on which are mountable any of (i) a first foil film that is the foil film having a first width, (ii) a second foil film that is the foil film having a second width smaller than the first width, the second foil film being configured to be mounted in a central region that is located at a widthwise central portion of a region in which the first foil film is mounted, and (iii) a third foil film that is the foil film having the second width, the third foil film being configured to be mounted in a one-side shifted region that is shifted to one of widthwise opposite sides in the region in which the first foil film is mounted, wherein the temperature sensor is located in an overlapping region in which the central region and the one-side shifted region overlap, so as to be closer to one of widthwise opposite ends of the second foil film than a widthwise center thereof, wherein the first correction value and the second correction value when the second foil film is mounted are determined to be greater than the first correction value and the second correction value when the first foil film is mounted, and wherein the first correction value and the second correction value when the third foil film is mounted are determined to be greater than the first correction value and the second correction value when the first foil film is mounted and less than the first correction value and the second correction value when the second foil film is mounted.

19. The foil transfer apparatus according to claim 17, wherein the first correction value when a width of the sheet is a first width is determined to be greater than the first correction value when the width of the sheet is a second width larger than the first width.

20. The foil transfer apparatus according to claim 17, wherein the first correction value when a thickness of the sheet is a first thickness is determined to be greater than the first correction value when the thickness of the sheet is a second thickness larger than the first thickness.

* * * * *

UNITED STATES PATENT AND TRADEMARK OFFICE
CERTIFICATE OF CORRECTION

| | |
|---|---|
| PATENT NO. | : 11,701,875 B2 |
| APPLICATION NO. | : 17/453350 |
| DATED | : July 18, 2023 |
| INVENTOR(S) | : Kentaro Mori and Ryosuke Sakai |

It is certified that error appears in the above-identified patent and that said Letters Patent is hereby corrected as shown below:

In the Claims

Claim 13, Column 20, Line 12:
Please change: "sheet on a foil film including foil and to transfer the foil to" to -- sheet on a foil film including a foil and to transfer the foil to --

Claim 17, Column 20, Line 60:
Please change: "sheet on a foil film including foil and to transfer the foil to" to -- sheet on a foil film including a foil and to transfer the foil to --

Signed and Sealed this
Seventh Day of November, 2023

Katherine Kelly Vidal
*Director of the United States Patent and Trademark Office*